Sept. 24, 1940.   G. SLAYTER ET AL   2,215,982
ELECTRIC FURNACE
Filed Jan. 20, 1939   2 Sheets-Sheet 1
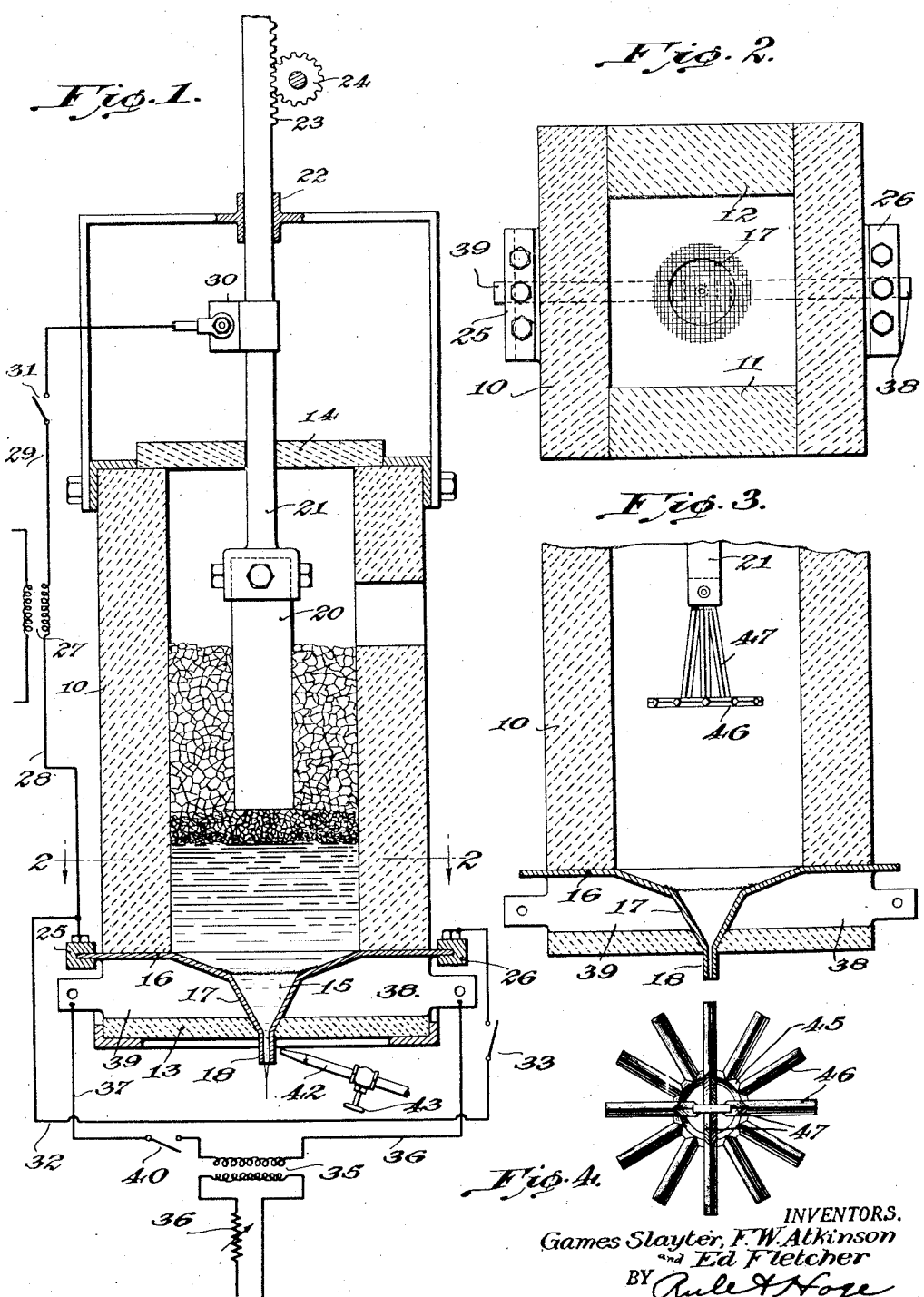
INVENTORS.
Games Slayter, F. W. Atkinson
and Ed Fletcher
BY
ATTORNEYS.

Sept. 24, 1940.   G. SLAYTER ET AL   2,215,982
ELECTRIC FURNACE
Filed Jan. 20, 1939   2 Sheets-Sheet 2
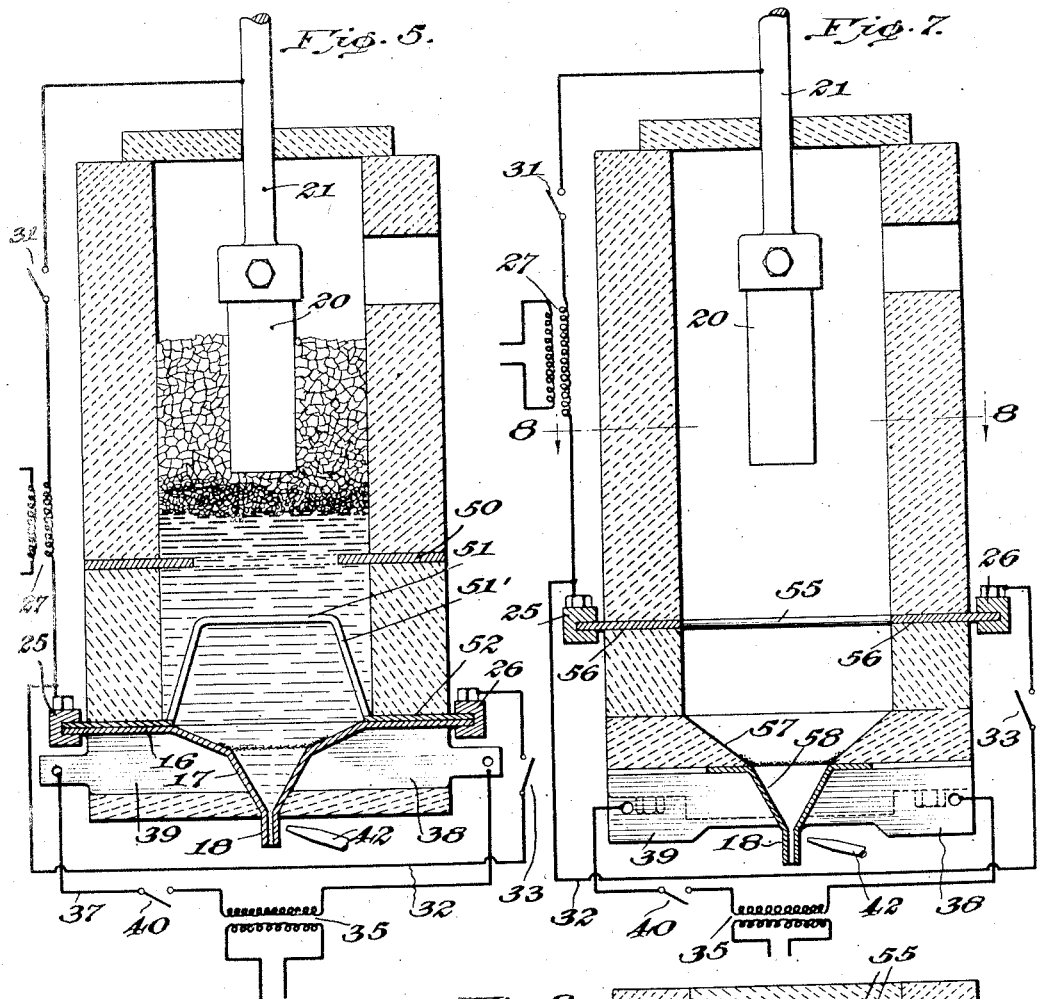
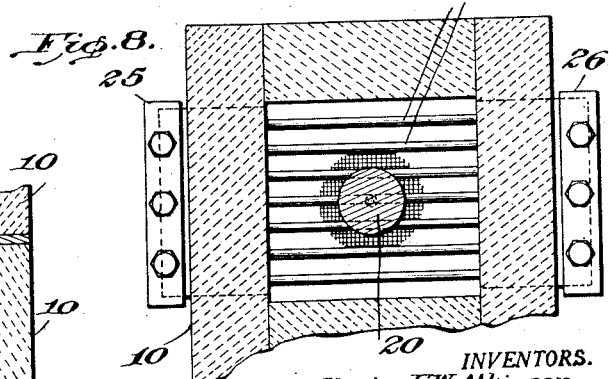
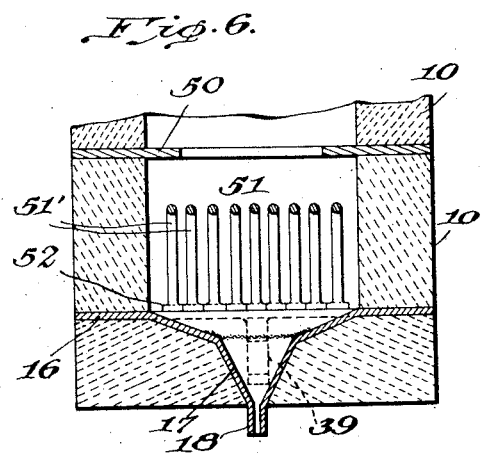
INVENTORS.
Games Slayter, F. W. Atkinson
and Ed Fletcher,
BY Rule & Hoge,
ATTORNEYS.

Patented Sept. 24, 1940

2,215,982

UNITED STATES PATENT OFFICE 2,215,982

ELECTRIC FURNACE

Games Slayter, Flavius W. Atkinson, and Ed Fletcher, Newark, Ohio, assignors to Owens-Illinois Glass Company, a corporation of Ohio Application January 20, 1939, Serial No. 252,004

7 Claims. (Cl. 13—6)

The present invention relates to improved methods and apparatus for melting and refining refractory and vitreous materials, silica, glass, ores, metals, and the like, especially those which are melted and fined at high temperatures. The invention is herein particularly described as adapted and used in the melting and fining of metal oxides in silica, as, for example, ordinary glass, but it will be understood that the invention is not limited to such use but comprehends the treatment of various other substances.

An object of the invention is to provide a novel and practical apparatus by which the raw glass batch or the like is melted and fined rapidly and economically, with the expenditure of a comparatively small amount of electrical energy per pound of glass melted, and with a furnace or apparatus which may be small as compared to furnaces of the type now in general use, of equal productive capacity.

Another object of the invention is to produce a clear, bright glass which is free from impurities ordinarily entering the glass from the electrical heating elements or electrodes.

It is another object of the present invention to provide an electrical glass furnace capable of melting the cold batch by means of electricity at the start of the operation without the necessity of preheating the glass by means of gas burners or other apparatus extraneous to the electric melting elements or electrodes of the furnace.

A further object of the invention is to provide a novel method and means in a furnace of the character indicated, for supplying heat locally to the glass issuing from the outlet or outlets and the glass in the immediate vicinity of the outlet. In the attainment of this object, the outlet orifice or orifices may be arranged to extend directly through the electrode.

A further object of the invention is to provide a method and means for electrically heating the bushing or outlet walls by current supplied independently of the main melting and refining current.

A further object of the invention is to provide novel means for heating and/or cooling the outlet bushing, thereby providing a heat control valve by which the rate of flow may be regulated and controlled. More specifically, a feature of the invention relates to the use of an electric current directed through the bushing or outlet walls independently of the melting and refining current and providing a heat valve, and separate cooling means.

Other objects of the invention will appear hereinafter.

The present application discloses subject matter also disclosed in our co-pending application, Serial No. 184,118, filed January 10, 1938, and is a continuation thereof as to such subject matter.

Referring to the accompanying drawings:

Fig. 1 is a sectional elevation of an electric furnace constructed in accordance with the present invention;

Fig. 2 is a sectional plan view of the same, the section being taken at the line 2—2 on Fig. 1;

Fig. 3 is a fragmentary sectional elevation showing a modification;

Fig. 4 is a plan view of the electrode shown in Fig. 3;

Fig. 5 is a sectional elevation of still another form of furnace;

Fig. 6 is a fragmentary sectional elevation of the lower portion of the furnace shown in Fig. 5, the section being taken at right angles to that of Fig. 5;

Fig. 7 is a sectional elevation of the furnace embodying a further modification; and Fig. 8 is a section at the line 8—8 on Fig. 7.

Referring particularly to Figs. 1 and 2, the furnace comprises vertical side walls 10, front wall 11, rear wall 12, a bottom 13 and a cap block or cover plate 14, said parts consisting as usual of refractory material. The bottom or floor 13 is formed with a well 15 extending therethrough and having downwardly convergent walls.

Overlying and lining the floor 13 is a metal plate 16 which serves as an electrode. A bushing 17 for the well 15 overlies and lines the walls of the well. The bushing is formed integral with the electrode 16 and in effect is a part thereof. The lower end of said bushing terminates in a tubular extension or spout 18 through which the molten glass issues. The electrode 16 and bushing 17 may be made of platinum, platinum-rhodium alloy or other suitable metal or alloy.

An upper electrode 20, preferably a solid rod of carbon, is placed within the furnace and supported by a vertical rod 21 to the lower end of which the electrode is attached. The rod 21 extends upwardly through the cap block 14 of the furnace and through a supporting frame 22. A rack 23 and pinion 24 provide means for adjusting the electrode 20 up and down.

The opposite ends of the electrode 16 are extended outwardly beyond the side walls of the furnace and have attached thereto connector blocks 25 and 26. Electric current for melting and refining the glass is supplied from any suitable source. As here shown, the current is supplied from a transformer 27, the secondary winding of which is connected through a conductor 28 to the connector block 25 and through a conductor 29 to a terminal 30 connected to the rod 21. A switch 31 is provided at any convenient point in the circuit between the electrodes. A conductor 32 is connected across the blocks 25 and 26 and provides for an even distribution of the current flowing through the electrode 16. A switch 33 is provided in the circuit 32.

Provision is made for thermally controlling the flow of glass through the spout 18 including means for electrically heating the bushing 17 and spout 18 independently of the current supply from the transformer 27. Such independent heating means comprises a transformer 35 having means 36 for adjustably varying the current. The secondary winding of the transformer is connected through conductors 36' and 37 to a pair of conductor bars 38 and 39 respectively. Said bars may be embedded in the floor of the furnace directly beneath the electrode 16, being shaped to conform to said electrode and the bushing 17 and directly or electrically connected thereto. A switch 40 is provided in the transformer circuit and when closed permits the current to pass through bars 38 and 39 and the bushing 17 and spout 18, thereby supplying heat to the spout and bushing independently of and in addition to that supplied from the transformer 27. There is thus provided a heat valve by which the rate of flow of the glass through the spout may be effectively regulated and controlled. By increasing the current flow the temperature of the bushing is raised with a corresponding rise in temperature and increase in the fluidity of the issuing stream of glass. This results in a comparatively rapid flow. By reducing the current flow and lowering the temperature, the glass becomes more viscous and the flow more sluggish. If desired, a blower 42 may be provided as an auxiliary to supplement the electrical control of the temperature. The blower is arranged to direct a blast of cooling gas against the spout 18. A valve 43 is used to regulate or entirely shut off the cooling blast. It will be understood that the use of electric current from the transformer 35 provides an effective means for controlling the current flow, quite independently of the blower 42, although in some situations the blower is desirable as an auxiliary means for controlling the temperature and rate of flow of glass and in some instances may be used independently of or as a substitute for the electrical control.

In starting the furnace the transformer 35 may be used to supply current in sufficient volume to the electrode plate 16 to raise it to a high temperature and supply heat to the glass batch until the temperature of the batch is raised to a degree at which it will function as a conductor. The transformer 27 may then be brought into service for continuing the melting and fining operation.

Figs. 3 and 4 illustrate a construction comprising a modified form of upper electrode. This electrode includes a horizontally disposed open ring 45 to which are connected fingers 46 extending radially outward from the ring and arranged in an annular series. The ring is supported by upwardly extending convergent rods 47 attached at their upper ends to the rod 21. This construction provides an openwork electrode presenting a large surface area to the glass batch which as it is fed downward wipes across the fingers, keeping them at a comparatively low temperature.

Figs. 5 and 6 illustrate a further modification. As here shown, a baffle plate 50 is built into the side walls of the furnace and projects inwardly beyond the inner faces of said walls for a short distance. This plate serves to direct and control the downward movement of the batch or molten material. We have found that molybdenum is a satisfactory material for such baffle plate. A series of parallel rods 51, preferably of tungsten, extend across the interior of the furnace some distance above the floor thereof. Each rod comprises legs 51', the lower ends of which are connected to or formed integral with plates 52 extending through the side walls of the furnace and connected to the terminal bars 25, 26. The rods 51 and plates 52 are positioned over plate 16 and cooperate therewith to form the lower electrode.

Figs. 7 and 8 illustrate a further modification in which the lower electrode consists of a series of parallel bars 55 of tungsten or other suitable material. These bars are connected to terminal plates 56 which extend through the side walls of the furnace and are connected to the terminal bars 25 and 26. In this manner the lower electrode is spaced some distance above the floor of the furnace. The opening through the floor block has downwardly convergent side walls 57. Beneath the floor block is a funnel-shaped member 58 which may correspond in form to the bushing 17 (Fig. 1) and terminates in a spout 18. The funnel 58 of aluminum, aluminum alloy or other suitable conducting material, is electrically heated by current supplied from the transformer 35 electrically connected thereto through the bars 38 and 39. There is thus provided a heat valve to control the flow of molten glass. It will be noted that with this construction the electrically heated funnel and spout are electrically and mechanically separated from the electrodes in the circuit of the transformer 27.

Modifications may be resorted to within the spirit and scope of our invention.

We claim:

1. Apparatus for melting and fining glass which comprises a melting chamber of refractory material, an upper electrode within the chamber, a lower electrode overlying and lining the floor of the chamber in direct contact with the molten glass throughout a major portion of the floor surface of the chamber, said lower electrode and floor having an outlet opening therethrough to permit an out-flow of molten glass at a predetermined rate, said lower electrode including a metallic lining for said outlet, means for supplying electric current to said electrodes, and means for independently electrically heating said outlet lining.

2. Apparatus for melting and fining glass which comprises a melting chamber of refractory material, an upper electrode within the chamber, a lower electrode overlying and lining the floor of the chamber in direct contact with the molten glass throughout a major portion of the floor surface of the chamber, said lower electrode and floor having an outlet opening therethrough to permit an out-flow of molten glass at a predetermined rate, said lower electrode including a metallic lining for said outlet, means for supplying electrical energy, means connecting the electrodes in series in circuit with said supply means for passing a current between the electrodes and through the intervening glass, and means independent of said current for adjustably varying the temperature of said metallic lining for the outlet and thereby controlling the temperature and rate of flow of the glass issuing from said outlet.

3. An apparatus for melting and fining glass which comprises a melting chamber of refractory materials having upstanding side walls and a floor, a perforated electrode extending across said chamber having openings therein through which unmelted batch may be fed from the upper portion of said chamber, a second electrode overlying said floor, said second electrode and said floor having an outlet opening therethrough adapted to emit molten glass at a predetermined rate, a metallic lining for said outlet integral with said second electrode, and means for independently electrically heating said outlet lining.

4. An electric melting apparatus comprising a melting chamber, an upper electrode, a lower electrode, means for supplying electrical energy and directing it from one electrode to the other through the material being melted, means associated with the lower electrode providing a spout through which a stream of the molten material is discharged, said spout having metal walls electrically connected to said lower electrode and heated by the said electric current, and independent means for simultaneously supplying additional electric current to the walls of said spout and thereby further electrically heating and adjustably varying the temperature of the walls of said spout.

5. An electric melting apparatus comprising a melting chamber, an upper electrode, a lower electrode, means for supplying electrical energy and directing it from one electrode to the other through the material being melted, means associated with the lower electrode providing a spout through which a stream of the molten material is discharged, said spout having metal walls connected to said lower electrode and heated by the said electric current, and separate means for supplying an electric current and directing it through metal walls of said spout.

6. Apparatus for melting and fining glass comprising a melting chamber having refractory walls, an upper electrode and a lower electrode within said chamber, said lower electrode formed to provide an outlet opening through which the molten glass is discharged at a predetermined rate, means for supplying an electric current and directing it through said electrodes and the material which is being melted and refined, and independent means for supplying electric current and directing it through the lower electrode and causing said electrode to function as a resistor and supply added heat to the molten material.

7. Apparatus for melting and fining glass comprising a melting chamber having refractory walls, a perforated upper electrode extending across the chamber having openings therein through which unmelted batch may be fed, a lower electrode within said chamber, said lower electrode formed to provide an outlet opening through which the molten glass is discharged at a predetermined rate, means for supplying an electric current and directing it through said electrodes and the walls of said outlet opening and through the material which is being melted and refined, and means independent of said electric current supply for adjustably varying the temperature of the walls of said outlet and thereby adjustably regulating and controlling the rate of flow of the molten glass through the spout.

GAMES SLAYTER.
FLAVIUS W. ATKINSON.
ED FLETCHER.